Patented Oct. 26, 1948

2,452,083

UNITED STATES PATENT OFFICE 2,452,083

METHOD OF REINFORCING ORGANIC-POLY-SULFIDE RUBBERY MATERIAL WITH CARBON BLACK

Theodore A. Te Grotenhuis, Olmsted Falls, Ohio

No Drawing. Application January 8, 1943, Serial No. 471,745

6 Claims. (Cl. 260—37)

This invention relates to products employing unmasticated synthetic rubber, to a method of preparing the same, and particularly to a method of preparing such products employing organic polysulfide rubbers reinforced with finely divided carbon.

A process for preparing rubber articles without mastication has many advantages over the conventional method of masticating compounding agents into rubber, in that heavy machinery need not be used and the rubber itself has a molecular structure which has not been deteriorated by mastication and is, therefore, more wear-resistant and age-resistant than masticated rubber articles. The preparation of articles directly from latices or from unmasticated rubber powders, however, has not to any appreciable degree displaced the older methods of preparing articles from masticated rubber, because it has not heretofore been known how, without mastication, to obtain the great advantages incident to the addition of substantial quantities of carbon black and the like. Carbon black greatly reinforces natural rubbers and greatly improves the polysulfide type polymers when it is masticated into these materials. However, when carbon black is incorporated into the rubber latex or mixed with the powdered rubber or rubbery polymer without mastication, the advantages such as reinforcing effects, etc. are not obtained. It appears to act only as a filler or diluent unless the rubber and black are thereafter masticated together.

In a copending application, Serial No. 527,929, filed March 24, 1944, I have described a method of preparing reinforced articles by forming an intimate mixture of carbon black and polymerizable materials, having the carbon black particles deflocculated and wetted by the polymerizable constituents, and polymerizing the polymerizable constituents of the mixture in finely divided form to provide a finely divided, reinforced synthetic rubber which may be utilized directly in finely divided form to prepare shaped, unmasticated synthetic rubber articles having even more desirable properties than articles produced from a masticated rubber mix of similar composition. The invention therein disclosed is primarily applicable to the preparation of unmasticated synthetic rubber articles which utilize a rubber of the type that is produced by straight polymerization and cannot be practiced when the entire rubbery constituents are formed only by the reaction of ingredients contained in two distinct phases or dissolved in a single aqueous phase, as are most of the rubbery materials to which this invention relates.

The present invention has for its object the preparation of articles utilizing substantially unmasticated synthetic rubber of the type formed by the interaction of ingredients contained in two distinct phases, one of which is relatively insoluble in the other, which rubber contains carbon black so incorporated that advantages of a masticated rubber and carbon black mix are obtained.

The present invention is primarily applicable to the preparation of reinforced articles utilizing unmasticated, olefin polysulfide rubbers and the like, which rubbers are prepared by the reaction of one or more reactive organic compounds, such as the olefin dihalides which are relatively insoluble in water, with one or more suitable soluble polysulfides, as described in the Patrick Patents Nos. 2,012,347, 2,142,144 and Reissue No. 19,207.

With a rubber produced by straight polymerization or interpolymerization of ingredients in a single phase, whether dispersed or not, the reinforcing agent may be mixed with any or all polymerizable components of the material which are capable of polymerizing into a rubber. On the other hand, in the case of rubbers which are produced by interaction of ingredients in a disperse phase with ingredients in a continuous phase, it is found that efficient use of the carbon black is not had when it is incorporated into the aqueous solution unless it is masticated after the coagulation of the rubberlike material. Efficient use is obtained in soft synthetic rubbers when the carbon black or other suitably finely divided carbon is incorporated into the relatively slightly soluble, reactive organic component of the rubber.

Carbon black is an extremely potent reinforcing material for natural rubber as well as for the polysulfide rubbers to which the present invention relates. Its use in natural rubbers is largely responsible for the improvement made in the last two decades in the wearing properties and strength of vehicle tires. When carbon black is masticated into rubber by the use of heavy milling machinery, great improvements result, even though the rubber molecules are simultaneously shortened and deteriorated by mastication as the improvement by carbon black is greater than the deteriorating effect. When carbon black is mixed in any other manner with natural rubber, as for example by its addition to latex and subsequent coagulation, it merely acts as an inert filler or cooling material and diluent with no material reinforcing effect unless the coagulated rubber is thereafter masticated. Similarly, when carbon black is added to a latex of polysulfide rubbers, the reinforcing effect on the coagulated material containing the carbon black dispersed therein between the globules of rubber is not noticed unless the coagulated material is thereafter masticated.

The reason for the great improvement by mastication of rubber and carbon black mixes has not been apparent. There are three changes that may be caused by mastication, any one of which could possibly account for the outstanding improvement obtained when the rubber-carbon black mix is formed by masticating rubber and carbon black together, as distinguished from mixing carbon black in a latex, coagulating the dispersed materials and not masticating the coagulant. First, mastication may by rubbing the carbon black against the rubber remove a portion of the adsorbed gases or hydrocarbons on the surface of the carbon particles, so that a more intimate contact is effected between the rubber and the carbon and a bond produced; second, mastication may cause the carbon black to penetrate the individual globules of rubber, instead of remaining at or on their surfaces, as when the rubber of a latex and the carbon black are precipitated together; and third, when the rubber or rubberlike polymer is of a relatively low plasticity, mastication causes increased plasticity and shortening of the molecules, and this may permit better wetting of the carbon black by the rubberlike material.

It may be noted that the particles of rubber in the latex are very small indeed and if the formation of an intimate mixture were the sole reason for the superior result heretofore only obtained by mastication, then the partial mixture formed by precipitation of a latex containing suspended carbon black should give some reinforcement. This has not been found to be the case.

I am aware that it has heretofore been proposed in patents, e. g. Patrick's Reissue Patent No. 19,207, to incorporate carbon black in the latex of the polysulfide type rubber. I am also aware that the Badollet Patent No. 2,040,818 discloses the preparation of filtering media by refluxing fuller's earth with a mixture of materials capable of reacting to produce a polysulfide rubber. By the processes disclosed in these patents, however, no reinforced rubber-like material can be produced without mastication and, of course, the composition of Badollet, having no relation to any reinforcing material at all, cannot show reinforcement of the rubbery material even if it were masticated.

According to the present invention, articles comprising a reinforced, substantially unmasticated rubbery material of the polysulfide type are preferred by forming an intimate mixture of finely divided carbon, such as carbon black, and the water-insoluble or the relatively slightly water-soluble component of the reaction, such for example as ethylene dichloride, or homologues or analogues thereof, preferably having a substituent attached to spaced, connected carbon atoms, which substituent is of a type that is capable of being split off during the subsequent reaction. The mixture thus formed is mixed with a suitable inorganic polysulfide solution, preferably under conditions such that the organic or olefinic compound forms a disperse phase, and the polysulfide solution and the olefin compound allowed to react until a dispersed rubber-like material containing effective amounts of carbon black within the globules is formed. Preferably, after suitable washing, desulfurizing, etc., suitable curing agents, such as zinc oxide, are incorporated with the finely divided material. The finely divided synthetic material is agglomerated in a suitable shape and the rubber cured to improve its elastic properties.

The amount of reinforcement of the rubbery materials is increased when the amount of carbon black is increased. For appreciable reinforcement of the rubbery material, 5% to 10% or 15% of carbon black, based on the amount of rubbery polymer, should be present and more than 20% or 30% is usually desirable. As much as 80% or 90% or so is sometimes desirable for certain uses.

Treatments which would appear to result in the formation of more intimate contact between the particles of carbon black and the reactive organic compounds are very important if the highest degree of reinforcement is to be obtained with a given quantity of carbon black. Thus, subjecting the carbon black and the reactive organic compounds to a thorough and intimate mixing of the type which causes rubbing or agitation of the carbon black particles in the presence of the reactive organic compound or mixture thereof, as may be obtained by running the carbon black and organic material together through a ball mill, colloid mill, homogenizer or the like, or even treatment of the organic material containing the carbon black with ultrasonic vibrations for a sufficient time to obtain an intimate mixture or dispersion of the carbon black, results in a strong reinforcement of the rubberlike material prepared by later reaction of the organic compounds with the inorganic polysulfide.

Treatments, such as obtainable with colloid mills and ball mills, supersonic vibrations and the like, apparently result in substantial deflocculation of the carbon black particles, rather than actually grinding of the carbon black. In the preparation of the carbon black and subsequent handling, there is a tendency for the particles to group or bond together; and to utilize the carbon black to best advantage as a reinforcing agent, it should be deflocculated in the presence of the polymerizable liquid material. According to colloidal chemists, simple stirring or agitation at low speed does not tend to cause deflocculation of powders in liquids, but with treatment such as mentioned above, it is possible to obtain intimate contact of the liquid with the small individual particles of the carbon black powder and eliminate the gas or air cushions brought about by absorption and replace these by direct contact of the vehicle with the powder, in other words, increase the wetting power of the carbon black. Carbon black thus wetting the reactive organic compounds retains good contact with the rubbery reaction product of those compounds with the alkali polysulfides.

Improved contact between the rubberlike polymers and the carbon black particles is also obtainable by suitably treating the carbon black to improve its adsorption properties and then permitting adsorption of polymerizable material thereon. Thus, the carbon black may be treated to activate it according to known procedure, e. g., by treatment at high temperature as by superheated steam, or by one of the known chemical treatments. Such activation treatment probably removes adsorbed gases or carbonizes adsorbed hydrocarbon, or both. The activated carbon particles may then be subjected to reactive liquid or gaseous organic material, or even to a polymerizable material, such as butadiene vapor, so that the carbon particles may adsorb an adherent layer of reactive or polymerizable material over their entire clean surfaces.

Although a rubbing action and the activation or surface cleaning steps are believed to act in a similar manner to bring the reactive organic material or the polymerizable material in closer contact with the surfaces of the particles, so that the bond will be strengthened by the increased molecular forces of attraction between the rubbery polymer thereafter formed and the carbon black, it is preferred to both treat the carbon black particles to increase their adsorption and to subject the carbon black particles to the above-mentioned rubbing or agitation in the presence of the organic material. Such an action, in addition to improving the contact between the carbon black and the rubberlike material thereafter formed, also causes more complete dispersion of the carbon black throughout the organic material.

The carbon black may also be treated by heating it in an atmosphere of the vaporous organic materials used, such for example as ethylene dichloride vapor, so that when the carbon black cools such vapor will tend to adhere to the surfaces of the carbon black particles. If the temperature is lowered and sufficient organic material is present so that condensation occurs, the surfaces of the particles may be readily wetted by the condensed material, so that the rubbery reaction product thereafter formed also wets the carbon black particles.

Carbon black particles, even after they are dispersed in the reactive organic liquid, have a tendency to agglomerate and the liquids should therefore preferably be agitated just prior to its admixture with the polysulfide. The tendency for agglomeration is reduced by suitably thickening the organic liquid. This may be accomplished by dissolving or dispersing a rubberlike material, such as rubber, reclaim or synthetic rubberlike polymer, into the reactive organic liquid, or by incorporating a relatively viscous rubber cement or a solution of a rubberlike material with an unemulsified reactive organic compound. Thickening may also be accomplished by incorporating in or forming in the unemulsified reactive organic material suitable amounts of a partially or completely polymerized rubbery material such as incompletely polymerized butadiene, styrene, or even chloroprene or mixtures of such materials, etc.

The tendency for agglomeration may also be reduced by treating the carbon black with an anti-agglomerating agent or incorporating such an agent into the slightly soluble organic liquid. Anti-agglomerating materials are usually amino type compounds, such as amides, amino alcohols, etc; lecithin, acrylic amides, ammonia gas, etc. are examples of such materials, soya lecithin being especially desirable. When the anti-agglomerant is ammonia, the carbon black just prior to dispersion in the liquid organic material may be subjected to the gaseous material.

The reactive organic material may be any of the relatively slightly water-soluble liquid compounds mentioned in the Patrick Patents 2,142,144, Reissue 19,207, 1,899,191, 2,282,287 and 2,278,127. These compounds are characterized by having a substituent, which is capable of being split off in the reaction with sodium polysulfide, attached to each of two different carbon atoms preferably spaced carbon atoms connected by intervening linkage. Compounds having halogen substituents are usually used, examples of the most frequently used compounds being ethylene dichloride, dichloro-diethyl ether, etc. Olefin additive compounds of the formula $C_nH_{2n}X_2$, where $n$ is 1 to 20 (preferably 2 to 5) and X is a halogen, or other group capable of being split off during the reaction, which group is of a type that does not impart much solubility to the compound, are often utilized, particularly those obtained from treatment of petroleum cracking gases. Rubberlike materials of superior properties are usually obtained when one or more of the reactive organic compounds are mixed together prior to the reaction. The resulting product is therefore not a polymer of any unit.

Although a di-substituted organic compound is preferred, other compounds which react with soluble polysulfides to produce a rubbery reaction product may be used. Thus, unsaturated aliphatic compounds with only a single replaceable substituent, such for example as allyl chloride, etc. may be used under suitable conditions, as described in the Jacobi Patent No. 2,259,470.

A liquid reactive organic compound-carbon mix, preferably prepared as above set forth, is then incorporated in a suitable alkaline polysulfide, which preferably contains a suitable protective colloid and a suitable dispersing agent, so that an emulsion of the organic constituents is formed.

When the organic compounds usually used are relatively volatile, suitable provisions may preferably be made during the reaction for holding the temperature of the mix substantially below the boiling point of the olefine compound, as it is important that these compounds do not become separated from the finely divided carbon. In order to increase the speed of the reaction, the boiling point of the material may be raised by the use of pressure.

The unemulsified mixture of carbon and reactive organic compound, or compounds capable of reacting with the inorganic or alkaline polysulfide to produce a rubbery product, is preferably added slowly and strongly agitated into the solution of polysulfide containing a molar excess of polysulfide sulfur, which is preferably in sufficient dilution to have a specific gravity somewhat near that of the olefinic compound. The mixture of polysulfide and dispersed olefinic compound is also preferably strongly agitated during the reaction, so that the temperature does not rise locally sufficiently to cause vaporization of large proportions of the di-substituted compound.

The speed of the reaction depends upon the temperature and the molecular length of the olefinic compound, faster reaction rates, as is well known, being attained with shorter olefinic compounds and higher temperatures. The reaction temperature is usually controlled so that about three to five hours are required for completion of the reaction.

One or more of the water-soluble polysulfides may be employed, such as polysulfides of sodium, potassium, barium, strontium, ammonium, calcium, or polysulfides of organic bases, such as triethanolamine, etc., although inorganic polysulfides of three or more sulfur atoms per molecule are usually used. The sodium or calcium polysulfides are usually preferred because of their low cost. The polysulfide solutions like the basic olefinic compounds may be prepared by the procedure and utilized in the concentration and in the manner set forth in the above-mentioned Patrick patents. The molecular proportion of sulfur in the polysulfide, like the length of the olefinic compound, substantially affects the properties of the rubber, as is there set forth; but one or more polysulfides of the general formula $RS_n$, where R is the equivalent of two monovalent positive radicals and $n$ is at least three and not greater than five, is preferable.

The dispersing agent may be any of the various types of dispersing agents, including the organic types which are not rendered ineffective by the sulfur composition. Finely divided oxygen compounds of metals of the alkaline earth group, such as highly precipitated magnesium hydroxide, barium sulfate, as well as oxides and carbonates and alkaline earth metals, when sufficiently finely divided appear to function as dispersing agents and are very desirable in stabilizing the latex formed by the reaction. About 2 to 50 parts by weight (based on 100 pounds of reaction product) of such hydroxides are usually used.

Although it is preferred that a protective colloid be present in the polysulfide solution before the addition of the organic compound-carbon mix, protective colloids may be added during the reaction or at any time prior to the washing of the resulting latex. The protective colloids may be one or more of the water-peptizable colloids which are well-known in the art, such as clay, various gums, starch, dextrine, saponins, etc., but protein materials, such as casein, glue, egg albumen, blood albumen, gelatine, etc., are usually preferred. The proportion of colloids may, like the proportion of dispersing agent, vary within wide limits, and event amounts as low at .1% of the product are usually effective, and as much as 5% may be used, about .5%, however, is usually used.

When the amount of carbon black is high and the intimate mixture of carbon and olefine halide or other di-substituted organic compound is too stiff to be readily and finely dispersed into the polysulfide solution, the mixture may be thinned with a small amount of a suitable solvent or plasticizer for the uncured polysulfide rubber. The solvent or plasticizer used should preferably be of a type which is relatively immiscible with the water, so that the dispersed globules of olefin are not appreciably dissolved in the aqueous medium. This is especially true when a substantial quantity of the relatively inert solvent or plasticizing liquid is utilized with the reactive organic material.

The following example illustrates the preparation of unmasticated polysulfide rubber reinforced with finely divided carbon.

600 gram moles of unemulsified ethylene dichloride are ground for twelve hours in a ball mill with 10,000 grams of a carbon black (P-33 Gastex) which had been previously treated with highly superheated steam to increase adsorption properties and cooled in an atmosphere of ethylene dichloride vapor, to provide an intimate mixture. This mixture while agitated is slowly added with vigorous agitation to about 325 liters of two molar sodium tetrasulfide solution in a suitable reaction vessel and containing about 650 gram moles of sodium tetrasulfide, 850 grams sodium hydroxide, and 2,000 grams magnesium chloride. The reaction vessel is preferably provided with coils for heating and cooling, an agitator, and means for maintaining pressure. The ethylene dichloride paste is slowly added with strong agitation. The temperatures maintained were about 150° F. to 160° F. during the addition. A liquefying pressure is maintained on the material in order to prevent vaporization of the ethylene dichloride from the dispersed globules of the carbon-containing mix. The temperature is then raised to about 95° C. and held there for about an hour or so with strong agitation.

One or more of the afore-mentioned protective colloids may be already present in the sulfide solution prior to the addition of the ethylene dichloride to maintain the rubber material of the latex in the form of discrete particles. The reaction product is a high molecular weight, soft polysulfide rubber in the form of a latex. The dispersed rubbery particles are found to contain substantially all of the added carbon black in a form which gives good reinforcement, and they may be readily washed to remove excess solvent and soluble electrolytes by settling and decantation of the wash water. The washed latex may also, if desired, be subjected to oxidizing treatments by bubbling air therethrough, etc., as set forth in the Patrick Patent No. 2,142,144, to further increase the tensile strength of articles therefrom. It also may be stablized and treated in the manner set forth in the Patrick Reissue Patent No. 19,207.

The ethylene dichloride in the above example may be substituted in whole or in part by other olefin dihalides, bis-chloroethers, and other organic compounds capable of reacting with alkaline polysulfides to produce a hard-to-rubbery reaction product, as set forth above to produce rubbery materials, containing carbon black dispersed therein, of varying characterictics.

According to one form of my invention, the finely divided rubbery material as prepared above may be utilized directly, as is Hevea latex, with or without the incorporation of additional compounding ingredients, as desired. Reinforced articles comprising a polysulfide rubber may be formed from such a dispersion of polysulfide rubber by coagulating the disperse phase of the dispersion in a desired form, drying and curing the coagulated material. Thus, fabrics may be coated with unmasticated and unswelled reinforced rubber by simply coating them with the aqueous dispersion, or articles may be formed by dipping a suitable form in the liquid a suitable number of times and drying the deposit.

The above latex is, however, preferably compounded with a suitable dispersion of zinc oxide and customary amounts of a dispersion of stearic acid or zinc stearate, prior to its utilization in forming shaped articles. Thus, for example, a latex containing 100 kilograms of the above rubber may be mixed with 10 parts of a curing agent of oxidizing character, for example lead oxide, bismuth oxide, zinc oxide, arsenic oxide, organic peroxides, aryl and aralkyl nitro and polynitro compounds, in the form of a dispersion, and .6 part of zinc stearate, also in the form of a dispersion. This compounded mix, with or without curing in latex form, may then be utilized directly as is Hevea latex in the formation of rubber articles by coagulating the dispersed globules in shaped form, drying and curing at a suitable temperature, such as around 140° C. or so. The coagulation may be accomplished by the use of suitable heat and sensitizing agents, by the use of electrodeposition, by the addition of acids, or by drying the latex in the unatomized condition.

The latex of the above example may, of course, be mixed with dispersions of other materials of rubberlike character, or with derivatives of such materials, or with polymerizable materials or mixtures of the type polymerizable to a rubbery or resinous product to obtain modified properties in the final product. Thus, dispersions of 2-chlorobutadiene-1,3, rubber chloride, etc. are often desirable. If substantial amounts of the olefin polysulfide latex is mixed with the latex of other synthetic rubbers, it is preferable that the added synthetic rubber latex also contains carbon black within the rubber globules in the manner of latices prepared in accordance with my above-mentioned copending application.

In another form of my invention, which form is especially applicable for the preparation of molded articles, including articles of molded rubber and metal, etc., the finely divided unmasticated polysulfide rubber with carbon black dispersed therein is prepared in the form of a dry powder, which may if desired be further mixed in finely divided form with additional compounding agents, introduced or injected into a mold through restricted openings to cause superior coalescence of the particles, and formed into a coherent mass of reinforced, shaped polysulfide material with the aid of heat and pressure.

If it is desired to prepare such a molding powder which may be utilized directly to form articles of unmasticated polysulfide rubbery polymer, the latex such as above described having finely divided carbon in the separate globules may be dried suddenly in a finely divided form by spraying suitably concentrated latex, preferably containing a protective colloid, such as 5% or 10% dextrine, etc. (based on the latex), in a suitable vacuum chamber capable of quickly drying the atomized liquid. The molding powder may also be prepared by methods described in the Stam Patent No. 2,009,531, or by methods similar to those used for the preparation of Hevea rubber in powder form, but differing in that the polysulfide latex contains finely divided carbon in the unmasticated globules of polysulfide rubber and is substituted for the Hevea latex. Thus, the latex may like natural latex in the Stam process be mixed with a protective colloid, such as dextrine, glue, ammoniacal zinc phosphate-protein solution, and sprayed by means of a centrifugal sprayer into hot dry air. When the rubbery material of the latex has substantial cold flow in the vulcanized state, the rubbery material is preferably suitably cured in latex form, with or without previous desulfurizing treatment. Suitable curing agents may be incorporated into the unemulsified reactive organic compound if desired. This incorporation is preferably had prior to the completion of the rubbing or deflocculation treatment above set forth.

The tackiness of the suspended rubber globules is usually considerably reduced by incorporating carbon black therein, and when sufficient carbon black is present to prevent adhesiveness of the polymerizable materials at normal or subnormal temperatures, the molding powder may be prepared by lowering the temperature to a point where adhesiveness does not occur and depositing the globules from the emulsion by the addition of an acid or an electrolyte or other coagulant. The deposited material may be mixed with a suitable powder or other material which upon drying prevents adhesion at normal temperatures unless the material is subjected to the above-mentioned shearing action by high pressure injection into a forming chamber through one or more small openings.

To illustrate the preparation of articles from reinforced, finely divided, dry polysulfide rubbery polymer, a latex prepared as above set forth with a suitable amount, such as 25% to 30%, or more, of finely divided carbon within the globules of polysulfide rubber and containing about 10% or so of dextrine, or other material adapted to prevent adhesion of the globules at normal temperatures, is dried in the atomized condition, as in the above-mentioned Stam patent, to produce a powder having finely divided carbon distributed throughout the globules thereof. 130 parts of the rubber powder thus produced were thoroughly mixed, without masticating the globules, with 10 parts zinc oxide, ½ part stearic acid, .2 part diphenyl quanidine. A weighed amount of the powdery mixture thus prepared is charged into the hopper of a plunger or injection type mold and forced by hydraulic pressure through one or more small orifices or tubes into the mold cavity, where it is compacted under high pressure and cured at temperatures above 80° C., preferably around 140° C. The olefin polysulfide rubber thus produced has substantially higher strength than such a rubber without carbon black. It also has substantially higher strength than a mix of the same composition wherein the carbon black was incorporated into the latex of rubbery material, where it does not enter into the globules in an appreciable amount. Since the molecular structure of the rubber material has not been broken down by mastication, the material has improved properties over a material prepared by a process wherein an equivalent amount of carbon black is masticated into the rubber.

By disposing a suitable metal part in the mold, which metal part has been coated with a suitable adhesive, of a type suitable for securing rubber to metal, such for example as a rubber conversion product or cyclized rubber derivative sold under the trade name of "Reanite," prepared as set forth in the application of Thomas Raymond Griffith, Serial No. 353,914, filed August 23, 1940, now Patent 2,386,213, articles having substantially unmasticated, reinforced polysulfide rubbery polymer firmly bonded to metal with great strength can be economically produced.

It is desirable to use injection molding technique, forcing the powdery material under high pressure through one or more relatively small orifices or restrictions into the mold cavity, as the passage of the powder through an orifice shears the surface coating from the particles so that adhesion between the separate particles is greatly improved. Injection molding is not necessary, however, when an adhesion-preventing coating such as the above-mentioned dextrine is not formed over the surface of the particles, or when the coating is readily absorbed within the particles while they are strongly pressed together at a curing or vulcanizing temperature.

It will be seen that the articles comprising reinforced olefin polysulfide material, formed into the desired shape, are produced without any appreciable mastication. The use of heavy mixing machinery found in the ordinary rubber mills and its undesirable effects on the molecular structure are, therefore, eliminated. The articles produced usually have a higher abrasion resistance and superior tensile strength than articles produced from a masticated mix of the same composition.

While the present invention has been described with particular reference to the organic-polysulfide type of rubbery polymer, it is applicable to the preparation of any rubbery-to-hard material reinforceable with carbon black wherein the material is formed by the reaction of ingredients in two distinct phases, one phase being continuous and preferably aqueous and the other phase being only slightly water-soluble. The desirable results are obtained when a small amount of carbon black is intimately mixed with one or more unemulsified active liquid organic ingredients which are only slightly soluble in water or the other phase. The carbon black should be incorporated prior to the interphase reaction and prior to forming the two-phase liquid mixture.

It is to be understood that variations and modifications of the specific process herein shown and described, for purposes of illustration, may be made without departing from the spirit of my invention.

What I claim is:

1. A method of preparing a substantially unmasticated reinforced rubbery material of the organic-polysulfide type, which comprises combining carbon black with a reactive liquid organic compound having connected to each of two carbon atoms connected by intervening structure a substituent group capable of being split off by a reaction with an aqueous solution of a water-soluble polysulfide to produce a rubbery reaction product, subjecting the carbon black to a deflocculation treatment in the presence of said reactive organic liquid to form an intimate mixture, and reacting the reactive organic material of the carbon black-containing mixture thus formed with an aqueous solution of a soluble polysulfide to obtain a rubbery reaction product having carbon black dispersed therein.

2. The process of claim 6 wherein the carbon black is treated to increase its capacity for adsorption prior to its incorporation with the reactive organic liquid.

3. The method of claim 1 wherein the organic liquid is a di-substituted ether having a substituent connected to each of two different carbon atoms, which substituents are capable of being split off by reaction with an alkaline polysulfide.

4. A method of preparing products employing a substantially unmasticated olefin polysulfide rubber comprising mixing at least 5% of carbon black with a liquid comprising undispersed ethylene dichloride to form a paste, mixing the paste thus formed with an aqueous solution of a water-soluble polysulfide, permitting the reaction to proceed in the presence of a protective colloid until a latexlike dispersion of finely divided polysulfide rubber containing carbon dispersed therein is obtained, mixing the finely divided rubber with compounding agents, then coalescing the particles in shaped form, and curing the coalesced rubber with the aid of heat and pressure.

5. In a method of preparing a substantially unmasticated organic-polysulfide rubbery material reinforced with carbon black, wherein the rubber is formed by the interaction of a water-immiscible liquid reactive organic material, having attached to each of two carbon atoms connected by intervening structure a substituent group capable of being split off by reaction with an alkaline polysulfide, and an aqueous solution of a water-soluble polysulfide, the steps which comprise dispersing effective amounts of carbon black into the unemulsified liquid organic material prior to the formation of the mixture of said compound and polysulfide solution, whereby the carbon is dispersed within the globules of rubberlike material formed by the ensuing reaction.

6. In a method of making a rubbery condensation product of the organic polysulfide type, wherein an aqueous solution of a water-soluble polysulfide is caused to react with the liquid organic compound having a substituent joined to each of two different carbon atoms, which substituent is split off by reaction with said water-soluble polysulfide to produce a rubbery substance, the steps which comprise intimately mixing with said carbon compound a substantial amount of carbon black, dispersing the mixture thus formed in an aqueous solution of a water-soluble polysulfide, allowing the ensuing reaction to continue until a rubbery material is obtained, separating some of the soluble electrolytes, drying, and curing said rubbery material in the desired shape.

THEODORE A. TE GROTENHUIS.

REFERENCES CITED

The following references are of record in the file of this patent:

UNITED STATES PATENTS

| Number | Name | Date |
| --- | --- | --- |
| Re. 19,487 | Patrick | Mar. 5, 1935 |
| 1,950,744 | Patrick | Mar. 13, 1934 |
| 2,040,818 | Badollet | May 19, 1936 |
| 2,272,747 | Frost et al. | Jan. 24, 1939 |

FOREIGN PATENTS

| Number | Country | Date |
| --- | --- | --- |
| 315,916 | Great Britain | July 22, 1929 |
| 499,747 | Great Britain | Jan. 24, 1939 |